(12) United States Patent
Harvey et al.

(10) Patent No.: US 7,131,509 B2
(45) Date of Patent: Nov. 7, 2006

(54) REVERSE OPERATION SAFETY CIRCUIT

(75) Inventors: Arthur James Harvey, Mantua, OH (US); Theodore G. Wetzel, Mayfield, OH (US)

(73) Assignee: Delta Systems, Inc., Streetsboro, OH (US)

( * ) Notice: Subject to any disclaimer, the term of this patent is extended or adjusted under 35 U.S.C. 154(b) by 0 days.

(21) Appl. No.: 11/408,543

(22) Filed: Apr. 21, 2006

(65) Prior Publication Data

US 2006/0185913 A1 Aug. 24, 2006

Related U.S. Application Data

(62) Division of application No. 10/626,375, filed on Jul. 24, 2003.

(51) Int. Cl.
*B60K 25/06* (2006.01)

(52) U.S. Cl. .................. 180/53.6; 180/273; 172/74

(58) Field of Classification Search .............. 180/53.6, 180/53.61, 53.62, 273; 172/74, 79, 83
See application file for complete search history.

(56) References Cited

U.S. PATENT DOCUMENTS

| | | | |
|---|---|---|---|
| 5,138,824 A | 8/1992 | Oshima et al. | |
| 5,156,232 A * | 10/1992 | Muroya et al. | 180/273 |
| 5,203,440 A * | 4/1993 | Peterson et al. | 477/171 |
| 5,314,038 A | 5/1994 | Peterson, Jr. | |
| 5,601,172 A | 2/1997 | Kale et al. | |
| 5,616,964 A | 4/1997 | Peterson, Jr. | |
| 5,645,135 A | 7/1997 | Peterson, Jr. | |
| 5,994,857 A | 11/1999 | Peterson, Jr. et al. | |
| 6,026,634 A | 2/2000 | Peter et al. | |
| 6,105,348 A | 8/2000 | Turk et al. | |
| 6,109,010 A | 8/2000 | Heal et al. | |
| 6,135,230 A | 10/2000 | Schenck et al. | |
| 6,189,646 B1 | 2/2001 | Brandt et al. | |
| 6,237,311 B1 | 5/2001 | Richards | |
| 6,316,891 B1 | 11/2001 | Hough | |
| 6,339,916 B1 | 1/2002 | Bensen | |
| 6,405,513 B1 | 6/2002 | Hancock et al. | |
| 6,437,458 B1 | 8/2002 | Baggett | |
| 6,591,594 B1 | 7/2003 | Hancock et al. | |
| 6,720,679 B1 * | 4/2004 | Harada et al. | 307/328 |
| 6,758,292 B1 * | 7/2004 | Shoemaker | 180/53.6 |
| 2004/0124026 A1 | 7/2004 | Walters et al. | |

* cited by examiner

*Primary Examiner*—Eric Culbreth
*Assistant Examiner*—Toan C. To
(74) *Attorney, Agent, or Firm*—Tarollsundheim, Covell & Tummino L.L.P.

(57) ABSTRACT

A safety system for a riding lawn mower that prevents powered operation of a PTO driven implement while in reverse unless an override switch is "ON". The override switch may be a sustained action two position switch and the PTO driven implement may be a lawn mower blade. In one embodiment, the override switch does not allow the engine to start if the override switch is on. In one embodiment, the override switch cooperates with an operator presence switch to prevent operation of the PTO driven implement when the override switch is on and the operator is not present.

23 Claims, 3 Drawing Sheets

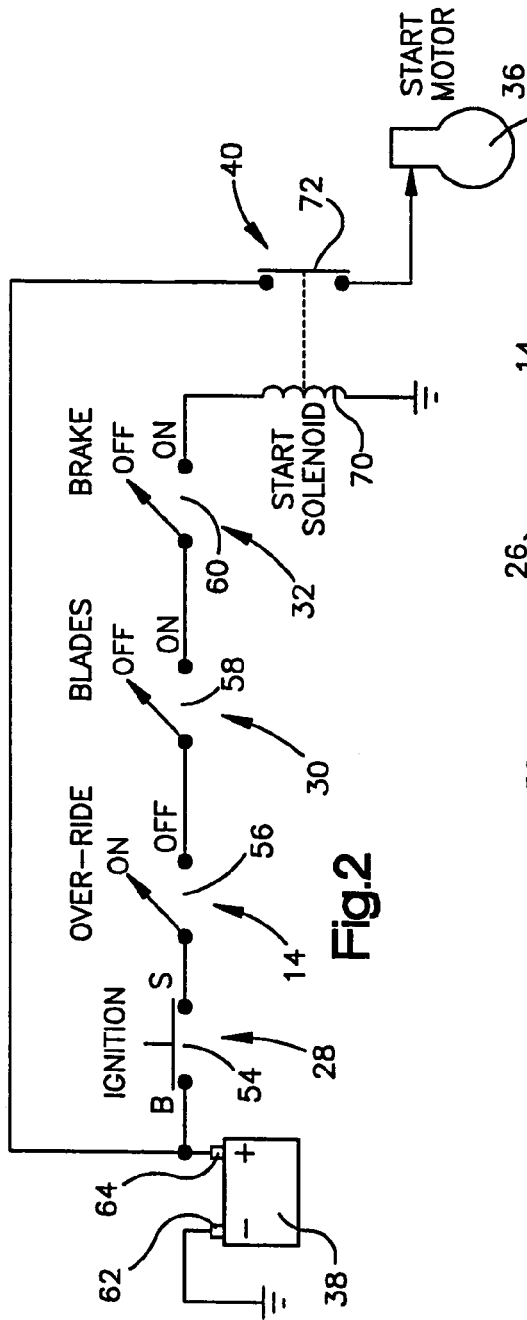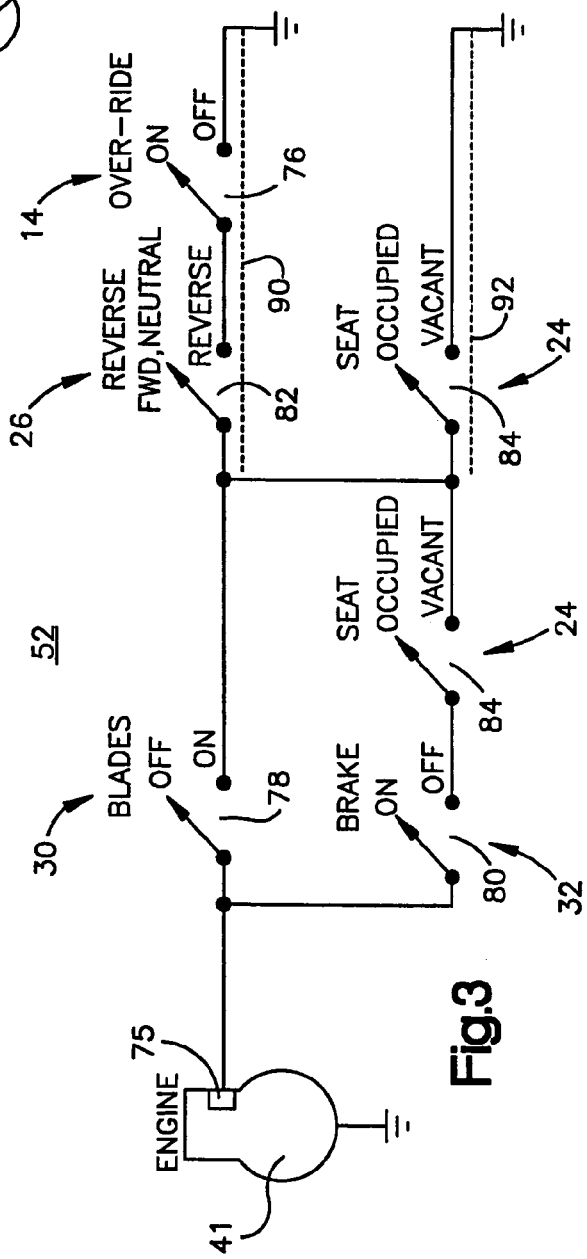

REVERSE OPERATION SAFETY CIRCUIT

This is a divisional of copending application(s) Ser. No. 10/626,375 filed on Jul. 24, 2003.

This application claims priority from U.S. application Ser. No. 10/626,375, filed on Jul. 24, 2003. U.S. application Ser. No. 10/626,375 is incorporated in its entirety herein by reference.

FIELD OF THE INVENTION

The present invention relates generally to lawn and garden tractors and similar vehicles. In particular, the present invention relates to a reverse operation safety circuit for such a vehicle.

BACKGROUND OF THE INVENTION

Lawn and garden tractors often have power take offs (PTOs) that drive implements such as mower blades. Prior lawn and garden tractors with PTOs have included interlock circuits that prevent engagement of the PTO driven implement when the vehicle is in reverse. Under certain conditions, operation of a PTO driven implement while the vehicle is in reverse is desirable. Various override systems have been proposed that allow operation of a PTO driven implement in reverse. Many of these override systems are difficult to operate.

Override systems have been developed that use a momentary override switch that latches an override relay. The override relay is unlatched when certain other conditions are met, like shifting out of reverse.

One proposed system uses a four-position ignition switch. The positions are "Off," "Run with override on," "Run with override off," and "Start." In that system the user must turn the key to the start position to start the engine, thus resetting the override on engine restart. The ignition switch spring returns the key from the "Start" position to the "Run with override off position," requiring an additional intentional movement of the key by the user to select "Run with override on."

SUMMARY OF THE INVENTION

The present invention concerns a safety system for a riding lawn mower that prevents powered operation of a PTO driven implement while in reverse unless an override switch is "ON". The override switch may be a sustained action two position switch and the PTO driven implement may be a lawn mower blade. One aspect of the present invention is that the override switch does not allow the engine to start if the override switch is on. A second aspect of the present invention is that the override switch cooperates with an operator presence switch to prevent operation of the PTO driven implement when the override switch is on and the operator is not present.

Embodiments of the invention are reverse operation control circuits for a lawn tractor having an engine and a PTO. One reverse operation control circuit includes a battery, a starter motor, an ignition switch, and an override switch. The ignition switch selectively energizes the starter motor with the battery to start the engine. The override switch allows operation of a PTO driven implement while the lawn tractor is in reverse when an actuator of the override switch is in a first position and inhibits operation of the PTO driven implement while the lawn tractor is in reverse when the actuator of the override switch is in a second position. The override switch inhibits the ignition switch from energizing said starter motor with the battery when the actuator of the override switch is in the first position. Movement of the actuator of the override switch from the first position to the second position allows the ignition switch to energize the starter motor with the battery if other conditions are met. In one embodiment, an "ON" override switch inhibits the ignition switch from energizing the starter motor by opening a path between the ignition switch and a starter solenoid.

One reverse operation control circuit includes an operator presence switch, such as a seat switch, and an override switch. The operator presence switch and the override switch prevent the PTO driven implement from operating when an operator is not present and the override switch is "ON." The PTO driven implement can be prevented from operating by using the state of the override switch to shut down the engine.

One reverse operation control circuit includes an operator presence switch, an additional safety switch, such as a PTO engagement switch, a brake/clutch switch and/or a reverse sense switch, and an override switch. The additional safety switch is connected to the operator presence switch. The operator presence switch and the additional safety switch prevent the PTO driven implement from operating when the additional safety switch is in a first state and an operator not present. The override switch and the operator presence switch bypass the additional safety switch to prevent the PTO driven implement from operating when an operator is not present and the override switch is "ON" regardless of the state of the additional safety switch.

One reverse operation control circuit includes a magneto, an operator presence switch, an additional safety switch, and an override switch. The additional safety switch is connected to the operator presence switch. The operator presence switch and the additional safety switch provide a path from the magneto to ground to prevent the engine from operating when the additional safety switch is in a first state and an operator not present. The operator presence switch and the override switch provide a path from the magneto to ground that bypasses the additional safety. This prevents the engine from operating when an operator is not present and the override switch is in the "ON" position regardless of the state of the additional safety switch.

One reverse operation control circuit includes a starter motor, a reverse sensing switch for sensing when the lawn tractor is in reverse, a PTO switch for sensing when a PTO driven implement is engaged, and a mow in reverse override switch. The override switch has an actuator that is movable between an "ON" position and an "OFF" position. The mow in reverse override switch prevents the starter motor from starting the engine when the actuator is in the "ON" position. In addition, the reverse sensing switch, the PTO switch, and the mow in reverse override switch prevent the engine from operating when the lawn tractor is in reverse, the PTO is engaged, and the actuator is in the "OFF" position.

One reverse operation control circuit includes a magneto coupled to the engine, a battery, a solenoid, an ignition switch for selectively communicating current flow from the battery to the solenoid to start the engine, a reverse sensing switch for sensing when the lawn tractor is in reverse, a PTO switch for sensing when a PTO driven implement is engaged, and a mow in reverse override switch. The override switch has an actuator that is movable between an "ON" position and an "OFF" position. The mow in reverse override switch opens a path from the battery to the solenoid to prevent the engine from starting when the actuator is in the "ON" position. Further, the reverse sensing switch, the PTO switch, and the mow in reverse override switch provide a path from the magneto to ground to prevent the engine from operating when the lawn tractor is in reverse, the PTO driven implement is engaged, and the actuator is in the "OFF" position.

Additional features of the invention will become apparent and a fuller understanding will be obtained by reading the following detailed description in connection with the accompanying drawings.

BRIEF DESCRIPTION OF THE DRAWINGS

FIG. 2 is a schematic of a control circuit for a lawn and garden tractor;

FIG. 3 is a schematic of a control circuit for a lawn and garden tractor; and

DETAILED DESCRIPTION OF THE INVENTION

Figure 1:
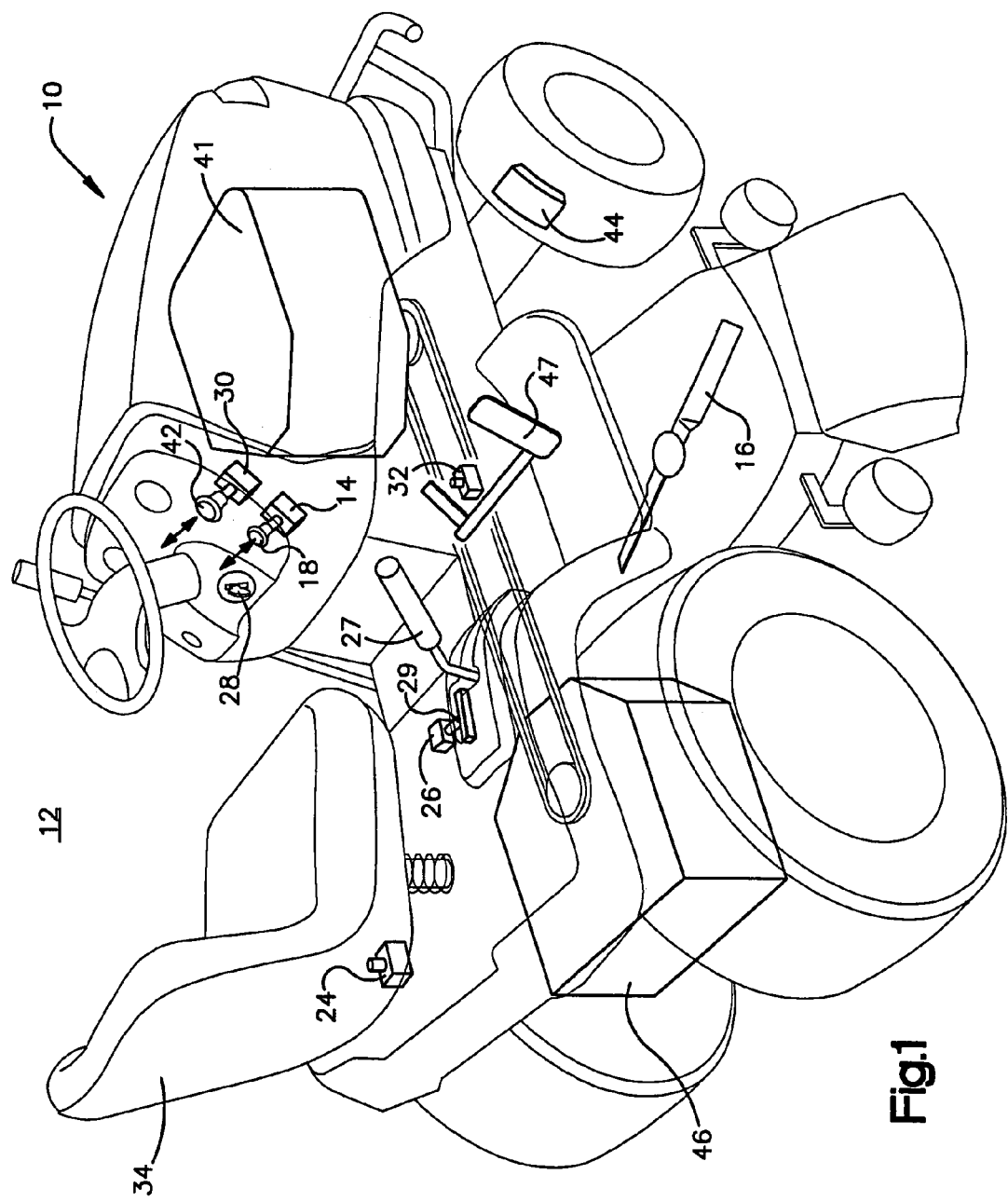
FIG. 1 is an illustration of a lawn and garden tractor equipped with a reverse operation override switch and safety switches.

The present disclosure concerns a safety system 10 for a riding lawn tractor 12. The safety system 10 includes an override switch 14 that allows operation of a PTO driven implement 16 while the lawn tractor is in reverse when an actuator 18 of the override switch is in a first or "override ON" position and inhibits operation of the PTO driven implement while the lawn tractor is in reverse when the actuator 18 of the override switch is in a second or "override OFF" position. One aspect of an exemplary system 10 is that the override switch must be in the "override OFF" position to start the engine. A second aspect of the present invention is that the override switch 14 cooperates with an operator presence switch 24 to prevent operation of the PTO driven implement 16 when the override switch is "ON" and the operator is not present.

FIG. 1 illustrates a lawn and garden tractor 12 equipped with the system 10 that allows operation of a PTO driven implement 16 when the tractor is in reverse. In the illustrated embodiment, the PTO driven implement 16 is a mower blade. It should be readily apparent that the system 10 could be applied to other PTO driven implements. For example, the PTO driven implement could be a snow thrower. In the exemplary embodiment, the system 10 comprises a plurality of switches. The system illustrated by FIG. 1 includes an override switch 14, an operator presence switch 24, a reverse sensing switch 26, an ignition switch 28, a PTO switch 30, and an engagement switch 32. The illustrated override switch 14 is a sustained action, multiple pole switch. The illustrated operator presence switch 24 is positioned below a seat 34 to sense the presence of an operator on the seat. In the illustrated embodiment, a lever 27 controls whether the lawn and garden tractor is in "Forward" or "Reverse." An actuator 29 of the illustrated reverse sensing switch 26 is in communication with the lever, such that the position of the actuator 29 indicates whether the lawn and garden tractor is in "Forward" or "Reverse." Referring to FIG. 2, the illustrated ignition switch 28 is a key switch that selectively energizes a starter motor 36 with voltage from a battery 38 to start the engine 41. In the exemplary embodiment, the ignition switch 28 closes a path between the battery 38 and a starter solenoid 40 to energize the starter motor 36 with the battery 38. On some lawn and garden tractors, movement of an actuator 42 of the PTO switch 30 between an "ON" position and an "OFF" position causes engagement and disengagement of the PTO driven implement respectively. On these tractors, the PTO switch 30 is coupled to a powered actuator that engages and disengages the PTO driven implement based on the position of the PTO switch actuator. On other lawn and garden tractors, the PTO driven implement 16 is engaged and disengaged by a manual movement of a mechanical PTO engagement linkage. On these tractors, the PTO switch actuator is moved by movement of the PTO engagement linkage and thereby senses engagement and disengagement of the PTO driven implement. The engagement switch 32 senses engagement of a brake 44 and/or engagement of a drive transmission 46. In the illustrated embodiment, a single switch senses the position of a pedal 47 that engages the brake and disengages the transmission 46 when depressed. In another embodiment, separate switches sense engagement of the brake and the transmission.

Figure 4:
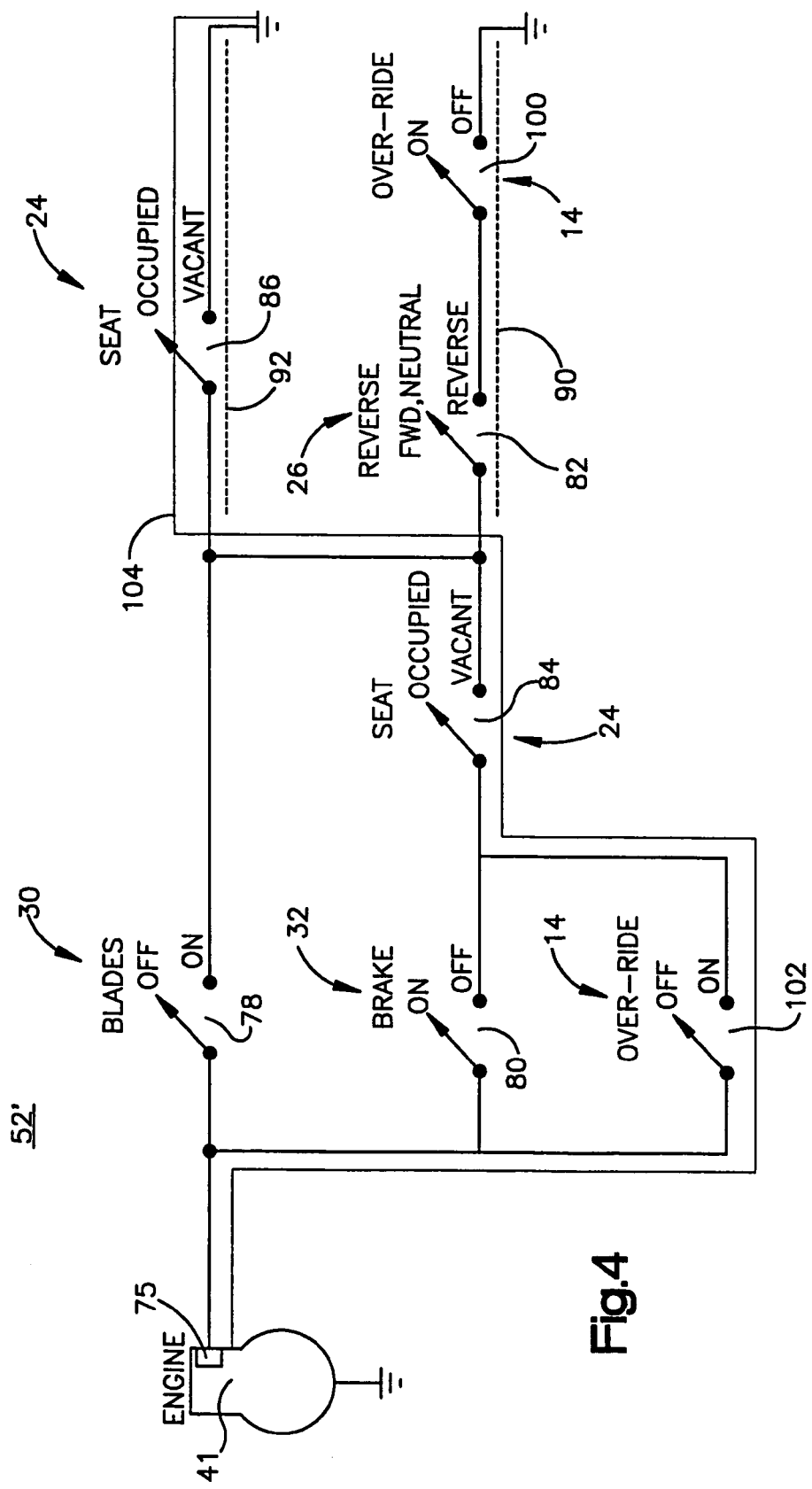
FIG. 4 is a schematic of a control circuit for a lawn and garden tractor.

In the exemplary embodiment, the safety system 10 includes a safe start circuit 50 (FIG. 2) and a safe operation circuit 52 (52') (FIGS. 3 and 4). The safe start circuit 50 prevents starting of the engine 41 when the switches sense a potentially unsafe condition. The safe operation circuit 52, shuts the engine down (and thereby the PTO driven implement) or the PTO driven implement itself down when the switches sense a potentially unsafe condition. In the illustrated embodiments, the switches of the safe start circuit 50 may also be used in the safe operation circuit 52 (52'). For example, the override switch is included in both the safe start circuit and the safe operation circuit.

A schematic of one suitable safe start circuit 50 is illustrated by FIG. 2. It should be readily apparent that this circuit could be modified or other circuits could be used to perform the same function as the illustrated circuit. The illustrated safe start circuit 50 includes the battery 38, an ignition switch start pole 54, an override switch first pole 56, a PTO switch first pole 58, an engagement switch first pole 60, a starter solenoid 40, and a starter motor 36. The ignition switch start pole 54 is closed when the ignition switch 28 is moved to a "Start" position. The override switch first pole 56 is open when the override switch 14 is in the "ON" position and is closed when the override switch is in the "OFF" position. The PTO switch first pole 58 is open when the PTO driven implement is engaged and is closed when the PTO driven implement is not engaged. The engagement switch first pole 60 is open when the transmission is engaged and/or the brake is not engaged and is closed when the transmission is not engaged and/or the brake is engaged. The starter solenoid 40 includes a coil 70 and a pole 72. The pole 72 closes when current passes through the coil 70.

A first battery terminal 62 is connected to ground. A second battery terminal 64, is connected in series with the ignition switch start pole 54, the override switch first pole 56, the PTO switch first pole 58, the engagement switch first pole 60, and a solenoid coil 70, which is connected to ground. The second battery terminal 64 is also connected to the solenoid pole 72, which is connected to the starter motor.

When the override switch is in the "OFF" position, the PTO driven implement is not engaged, and the transmission is not engaged and/or the brake is engaged, movement of the ignition switch 28 to a "Start" position provides a path to solenoid coil 70. In this state, the solenoid coil 70 is energized and the solenoid pole 72 closes. Electricity passes from the battery through the solenoid pole 72 to the starter motor to start the engine 41. This condition, under which the circuit illustrated by FIG. 1 allows the mower to start is defined by Logic Equation 1.

Safe Start=Override OFF AND PTO Off AND Brake On    Logic Equation 1

The terms in Logic Equation 1 have the following meanings:

Override Off—The actuator of the override switch is in the "Off" position.

PTO Off—The PTO driven implement is not engaged.

Brake On—The brake is On and/or the transmission is not engaged.

When the override switch is in the "ON" position, the PTO driven implement is engaged, and/or the transmission is engaged (the brake is not engaged), a path is not provided to the solenoid coil 70. Movement of the ignition switch 28 to the "Start" position does not energize the solenoid coil 70 to close the solenoid pole 72 and the engine does not start.

A schematic of a safe operation circuit 52 of a first embodiment is illustrated by FIG. 3. In one embodiment, the system 10 includes the safe start circuit 50 illustrated by FIG. 2 and the safe operation circuit 52 illustrated by FIG. 3. It should be readily apparent that this circuit could be modified or other circuits could be used to perform the same function as the illustrated circuit. In the embodiment illustrated by FIG. 3, the engine 41 is not necessarily shut down if the operator gets out of the seat and the override switch is left ON. The safe operation circuit 52 illustrated by FIG. 3 includes an engine 41 having a magneto 75, an override switch second pole 76, a PTO switch second pole 78, an engagement switch second pole 80, a reverse sense switch first pole 82, an operator presence switch first pole 84, and an operator presence second pole 86. In the safe operation circuit illustrated by FIG. 3, a path from the magneto 75 to ground is provided when an unsafe condition is detected to shut the engine down. Shutting the engine down also has the effect of shutting down the PTO driven implement. For example, the reverse sensing switch, the PTO switch, and the mow in reverse override switch prevent the engine from operating when the lawn tractor is in reverse, the PTO is engaged, and the override switch is "OFF."

An the embodiment illustrated by FIG. 3, the override switch second pole 76 is closed when the override switch is in the "OFF" position and is open when the override switch is in the "ON" position. The PTO switch second pole 78 is closed when the PTO driven implement is engaged and is open when the PTO driven implement is not engaged. The engagement switch second pole 80 is closed when the transmission is engaged and/or the brake is not engaged and is open when the transmission is not engaged and/or the brake is engaged. The reverse sense switch first pole 82 is closed when the tractor is in reverse and is open when the tractor is not in reverse. The operator presence switch first and second poles 84, 86 are closed when the operator is not present and are open when the operator is present.

Referring to FIG. 3, the magneto 75 is connected to the PTO switch second pole 78. Connected in parallel with the PTO switch second pole are the engagement switch second pole 80 and the operator presence switch first pole 84, which are connected in series. When closed, the reverse sense switch first pole 82 connected in series with the override switch second pole 76 provide a first path 90 to ground from the magneto through either (1) the PTO switch second pole 78 or (2) the series connected engagement switch second pole 80 and the operator presence switch first pole 84. A second path 92 to ground from the magneto through either (1) the PTO switch second pole 78 or (2) the series connected engagement switch second pole 80 and the operator presence switch first pole 84 is provided by the seat switch second pole 86 when closed. A list of conditions under which the circuit illustrated by FIG. 3 does not ground the magneto and therefore allows the mower to continue operating is set forth in Logic Equation set 2. If none of the equations of Logic Equation set 2 are satisfied, the circuit illustrated by FIG. 3 grounds the magneto to shut down the engine. Statements 2A–2G are all equivalent statements of the same logic condition for safe operation.

EQUATION SET 2

Safe Operation = [In Seat OR (Blades Off AND            2A
                Brake On)] AND
                {[NOT(In Reverse AND
                Blades On)] OR Override On}

= [In Seat OR (Blades Off AND Brake       2B
                On)] AND [(NOT In Reverse OR NOT
                Blades On) OR Override On]

= [In Seat OR (Blades Off AND Brake       2C
                On)] AND [(NOT In Reverse OR
                Blades Off) OR Override On]

= [In Seat OR (Blades Off AND Brake       2D
                On)] AND (NOT In Reverse OR Blades
                Off OR Override On)

= In Seat AND NOT In Reverse OR           2E
                In Seat AND Blades Off OR
                In Seat AND Override On OR
                Blades Off AND Brake On AND NOT
                In Reverse OR
                Blades Off AND Brake On OR
                Blades Off AND Brake On AND
                Override On = In Seat AND NOT In Reverse OR           2F
                In Seat AND Blades Off OR
                In Seat AND Override On OR
                Blades Off AND Brake On = Blades Off AND (Brake On OR In Seat)    2G
                OR In Seat AND (NOT In Reverse
                OR Override On)

The terms in Equation set 2 have the following meanings:

In Seat—An operator is present on the tractor.

Blades Off—The PTO driven implement is not engaged.

Blades On—The PTO driven implement is engaged.

Brake On—The brake is on and/or the transmission is not engaged.

In Reverse—The tractor is in reverse.

Override On—The override switch is on.

A schematic of a safe operation circuit 52' of a second embodiment is illustrated by FIG. 4. In a second embodiment, the system 10 includes the safe start circuit 50 illustrated by FIG. 2 and the safe operation circuit 52' illustrated by FIG. 4. It should be readily apparent that this circuit could be modified or other circuits could be used to perform the same function as the illustrated circuit. In this embodiment, the safe operation circuit 52' shuts the engine down if the operator gets out of the seat and the override switch is left on. This prevents one or more situations from occurring. For example, a first operator could turn the mow in reverse switch on and get off the mower while leaving the mower running. A second operator that gets on the running mower would not have actively turned the mow in reverse switch on and might have no idea that the mow in reverse switch is on. Similarly, an operator could turn the mow in reverse switch on and get off the mower while leaving the mower running. The operator could get back on the mower after a period of time, having forgotten that she had turned the mow in reverse switch on. In this embodiment, the Override switch is a three pole switch. The first pole is used in the safe start circuit and second and third poles 100, 102 art used in the safe operation circuit.

The safe operation circuit 52' illustrated by FIG. 4 includes an engine 41 having a magneto 75, an override switch second pole 100, an override switch third pole 102, a PTO switch second pole 78, an engagement switch second pole 80, a reverse sense switch first pole 82, an operator presence switch first pole 84, and an operator presence switch second pole 86. In the embodiment illustrated by FIG. 4, a path from the magneto 75 to ground is provided when an unsafe condition is detected to shut down the engine, and thereby shuts down the PTO driven implement. For example, the operator presence switch and the override switch stop the engine from operating when the operator leaves the lawn tractor and the override switch is "ON." The override switch second pole 100 is closed when the override switch is in the "OFF" position and is open when the override switch is in the "ON" position. The override switch third pole 102 is open when the override switch is in the "OFF" position and is closed when the override switch is in the "ON" position. The PTO switch second pole 78 is closed when the PTO driven implement is engaged and is open when the PTO driven implement is not engaged. The engagement switch second pole 80 is closed when the transmission is engaged and/or the brake is not engaged and is open when the transmission is not engaged and/or the brake is engaged. The reverse sense switch first pole 82 is closed when the tractor is in reverse and is open when the tractor is not in reverse. The operator presence switch first and second poles 84, 86 are closed when the operator is not present and are open when the operator is present.

Referring to FIG. 4, the magneto 75 is connected to the PTO switch second pole 78. Connected in parallel with the PTO switch second pole are the engagement switch second pole 80 and the operator presence switch first pole 84, which are connected in series. Connected in parallel with the engagement switch second pole 80 is the override switch third pole 102. When closed, the reverse sense switch first pole 82 connected in series with the override switch second pole 76 provide a first path 90 to ground from the magneto through either (1) the PTO switch second pole 78, (2) the series connected engagement switch second pole 80 and the operator presence switch first pole 84, or (3) the override switch third pole 102 and the operator presence switch first pole 84. A second path 92 to ground from the magneto through either (1) the PTO switch second pole 78, (2) the series connected engagement switch second pole 80 and the operator presence switch first pole 84, or (3) the override switch third pole 102 and the operator presence switch first pole 84 is provided by the seat switch second pole 86 when closed.

In the circuit 52' illustrated by FIG. 4, the operator presence switch and the override switch provide a path 104 from the magneto to ground that bypasses the additional safety switches. This prevents the engine from operating when an operator is not present and the override switch is in the "ON" position regardless of the state of the other safety switches.

A list of conditions under which the circuit illustrated by FIG. 4 does not ground the magneto and therefore allows the mower to continue operating is set forth in Logic Equation set 3. If none of the equations of Logic Equation set 2 are satisfied, the circuit illustrated by FIG. 3 grounds the magneto to shut down the engine and thereby disable the PTO driven implement. Statements 3A–3J are all equivalent statements of the same logic condition for safe operation.

EQUATION SET 3

Safe Operation = [In Seat OR (Blades Off AND Brake On)] AND {[NOT(In Reverse AND Blades On)] OR Override On} AND NOT(Override On AND Not In Seat)  (3A)

= [In Seat OR (Blades Off AND Brake On)] AND [(NOT In Reverse OR NOT Blades On) OR Override On] AND (NOT Override On OR In Seat)  (3B)

= [In Seat OR (Blades Off AND Brake On)] AND [(NOT In Reverse OR Blades Off) OR Override On] AND (Override Off OR In Seat)  (3C)

= [In Seat OR (Blades OFF AND Brake On)] AND (NOT In Reverse OR Blades Off OR Override On) AND (Override Off OR In Seat)  (3D)

= (In Seat AND NOT In Reverse OR In Seat AND Blades Off OR In Seat AND Override On OR Blades Off AND Brake On AND NOT In Reverse OR Blades Off AND Brake On AND Override On) AND (Override Off OR In Seat)  (3E)

= (In Seat AND NOT In Reverse OR In Seat AND Blades Off OR In Seat AND Override On OR Blades Off AND Brake On) AND (Override Off OR In Seat)  (3F)

-continued

= In Seat AND NOT In Reverse AND Override Off OR In Seat AND NOT In Reverse OR In Seat AND Blades Off AND Override Off OR In Seat AND Blades Off OR In Seat AND Override On AND Override Off OR In Seat AND Override On OR Blades Off AND Brake On AND Override Off OR Blades Off AND Brake On AND In Seat    3G = In Seat AND NOT In Reverse OR In Seat AND Blades Off OR In Seat AND Override On OR Blades Off AND Brake On AND Override Off    3H = In Seat AND (NOT In Reverse OR Blades Off OR Override On) OR Blades Off AND Brake On AND Override Off    3I = Blades Off AND [(Brake On AND Override Off) OR In Seat] OR In Seat AND (NOT In Revese OR Override On)    3J The terms in Equation set 2 have the following meanings:
In Seat—An operator is present on the tractor.
Blades Off—The PTO driven implement is not engaged.
Blades On—The PTO driven implement is engaged.
Brake On—The brake is on and/or the transmission is not engaged.
In Reverse—The tractor is in reverse.
Override On—The override switch is on.
Override Off—The override switch is off.

In the exemplary embodiment, the override switch is marked with one or two visual indicators or icons that convey switch function to the operator. For example, the switch actuator could indicate by its position, which of two states (mow in reverse or no mow in reverse) is currently selected. This is not possible with momentary override switches. The illustrated mow in reverse switch is a sustained action override switch that is independent from the ignition switch.

Although the present invention has been described with a degree of particularity, it is the intent that the invention include all modifications and alterations falling within the spirit or scope of the appended claims.

The invention claimed is:

1. A reverse operation control circuit for a lawn tractor having an engine and a PTO, comprising:
 a) an operator presence switch for detecting the presence of an operator on the lawn and garden tractor; and
 b) an override switch that allows operation of a PTO driven implement while the lawn tractor is in reverse when the override switch is in a first position and inhibits operation of the PTO driven implement while the lawn tractor is in reverse when the override switch is in a second position, said operator presence switch and said override switch prevent said PTO driven implement from operating when an operator is not present and said override switch is in said first position.

2. The reverse operation control circuit of claim 1 wherein the override switch is a sustained action two-position switch.

3. The reverse operation control system of claim 1 wherein said operator presence switch and said override switch prevent said PTO driven implement from operating when an operator is not present and said override switch is in said first position by shutting the engine down.

4. The reverse operation circuit of claim 1 wherein said operator presence switch is a seat switch that senses whether an operator is sitting on a seat of the lawn tractor.

5. The reverse operation control system of claim 1 wherein the engine is a magneto operated engine and the operator presence switch and the override switch prevent said engine from operating when an operator is not present and the override switch is in the first position by grounding a magneto.

6. The reverse operation control system of claim 1 wherein the engine is a magneto operated engine and the operator presence switch and the override switch prevent said engine from operating when an operator is not present and the override switch is in the first position by grounding a magneto to prevent the PTO driven implement from operating.

7. A reverse operation control circuit for a lawn tractor having an engine and a PTO, comprising:
 a) an operator presence switch for detecting the presence of an operator on the lawn and garden tractor;
 b) an additional safety switch connected to said operator presence switch, wherein said operator presence switch and said additional safety switch prevent the engine from operating when said additional safety switch is in a first state and an operator not present; and
 c) an override switch that allows operation of the engine while the lawn tractor is in reverse when the override switch is in a first position and inhibits operation of the engine while the lawn tractor is in reverse when the override switch is in a second position, said operator presence switch and said override switch bypass said additional safety switch to prevent said PTO driven implement from operating when an operator is not present and said override switch is in said first position regardless of the state of the additional safety switch.

8. The reverse operation control circuit of claim 7 wherein the override switch is a sustained action two-position switch.

9. The reverse operation control circuit of claim 7 wherein said operator presence switch is a seat switch that senses whether an operator is sitting on a seat of the lawn tractor.

10. The reverse operation control system of claim 7 wherein the engine is a magneto operated engine and the operator presence switch and the override switch prevent said engine from operating when an operator is not present and the override switch is in the first position by grounding a magneto to thereby prevent the PTO driven implement from operating.

11. The reverse operation control system of claim 7 wherein said additional safety switch is a PTO engagement switch, wherein said operator presence switch and said PTO engagement switch prevent the engine from operating when an operator is not present and a state of the PTO engagement switch indicates that the PTO driven implement is engaged.

12. The reverse operation control system of claim 7 wherein the additional safety switch is an engagement switch, wherein said operator presence switch and said engagement switch prevent the engine from operating when an operator is not present and a state of the engagement switch indicates that a brake is not engaged.

13. The reverse operation control system of claim 7 wherein the additional safety switch is an engagement switch, wherein said operator presence switch and said engagement switch prevent the engine from operating when an operator is not present and a state of the engagement switch indicates that a transmission is engaged.

14. A reverse operation control circuit for a lawn tractor having an engine and a PTO, comprising:
 a) a magneto coupled to the engine;
 b) an operator presence switch for detecting the presence of an operator on the lawn and garden tractor;
 c) an additional safety switch connected to said operator presence switch, wherein said operator presence switch and said additional safety switch provide a path from the magneto to ground to prevent the engine from operating when said additional safety switch is in a first state and an operator not present;
 d) an override switch that allows operation of a PTO driven implement while the lawn tractor is in reverse when the override switch is in a first position and inhibits operation of the PTO driven implement while the lawn tractor is in reverse when the override switch is in a second position, said operator presence switch and said override switch provide a path from the magneto to ground that bypasses said additional safety switch to prevent said engine from operating when an operator is not present and said override switch is in said first position regardless of the state of the additional safety switch.

15. The reverse operation control circuit of claim 14 wherein said operator presence switch is a seat switch that senses whether an operator is sitting on a seat of the lawn tractor.

16. The reverse operation control system of claim 14 wherein the engine is a magneto operated engine and the operator presence switch and the override switch prevent said engine from operating when an operator is not present and the override switch is in the first position by grounding a magneto.

17. The reverse operation control system of claim 14 wherein said additional safety switch is a PTO engagement switch, wherein said operator presence switch and said PTO engagement switch prevent the engine from operating when an operator is not present and a state of the PTO engagement switch indicates that the PTO driven implement is engaged.

18. The reverse operation control system of claim 14 wherein the additional safety switch is an engagement switch, wherein said operator presence switch and said engagement switch prevent the engine from operating when an operator is not present and a state of the engagement switch indicates that a brake is not engaged.

19. The reverse operation control system of claim 14 wherein the additional safety switch is an engagement switch, wherein said operator presence switch and said engagement switch prevent the engine from operating when an operator is not present and a state of the engagement switch indicates that a transmission is engaged.

20. A method of controlling reverse operation of a lawn tractor, comprising:
 a) detecting whether an operator is present on the lawn and garden tractor;
 b) allowing operation of a PTO driven implement while the lawn tractor is in reverse when an override switch is in a first position;
 c) inhibiting operation of the PTO driven implement while the lawn tractor is in reverse when the override switch is in a second position;
 d) preventing said PTO driven implement from operating when an operator is not present and said override switch is in said first position.

21. The method of claim 20 wherein said PTO driven implement is prevented from operating when an operator is not present and said override switch is in said first position by shutting the engine down.

22. The method of claim 20 said the PTO driven implement is prevented from operating when an operator is not present and the override switch is in the first position by grounding a magneto.

23. A method of controlling reverse operation of a lawn tractor, comprising:
 a) detecting whether an operator is present on the lawn and garden tractor;
 b) preventing the engine from operating when an additional safety switch is in a first state and an operator not present;
 c) allowing operation of the engine while the lawn tractor is in reverse when an override switch is in a first position;
 d) inhibiting operation of the engine while the lawn tractor is in reverse when the override switch is in a second position by bypassing said additional safety switch to prevent said PTO driven implement from operating when an operator is not present and said override switch is in said first position regardless of the state of the additional safety switch.

* * * * *